I. A. GREEN.
Wheel-Cultivator.
No. 34,630.
2 Sheets—Sheet 1.
Patented Mar 11, 1862.
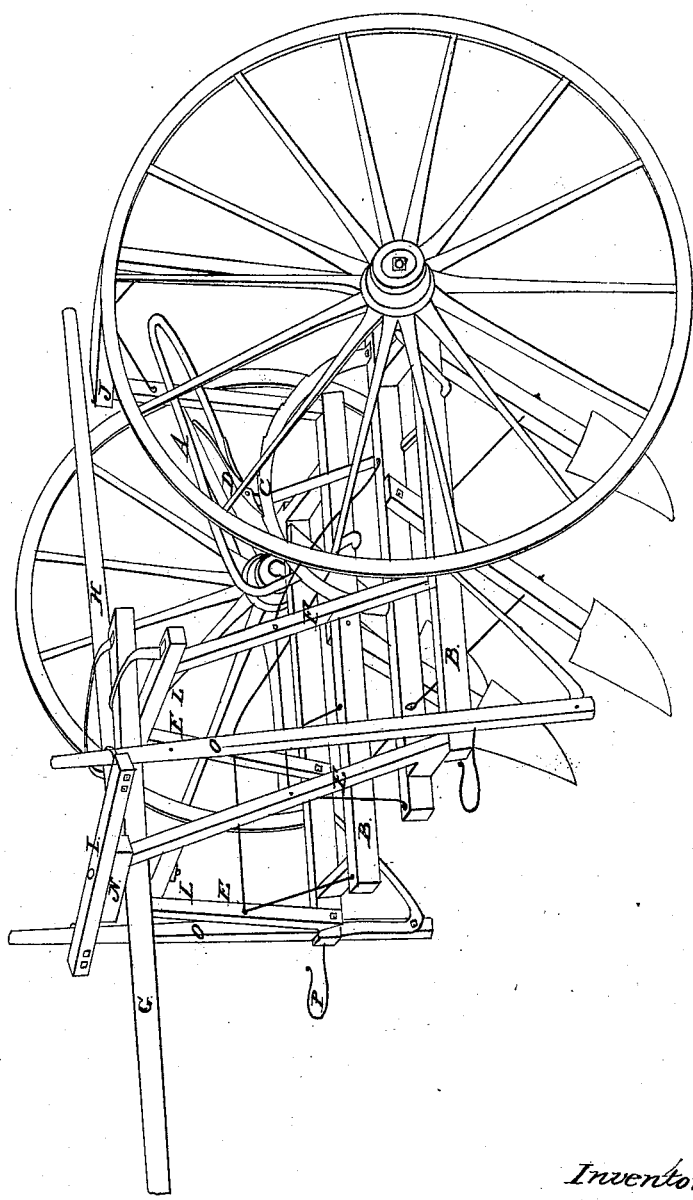

2 Sheets—Sheet 2.
I. A. GREEN.
Wheel-Cultivator.
No. 34,630. Patented Mar 11, 1862.
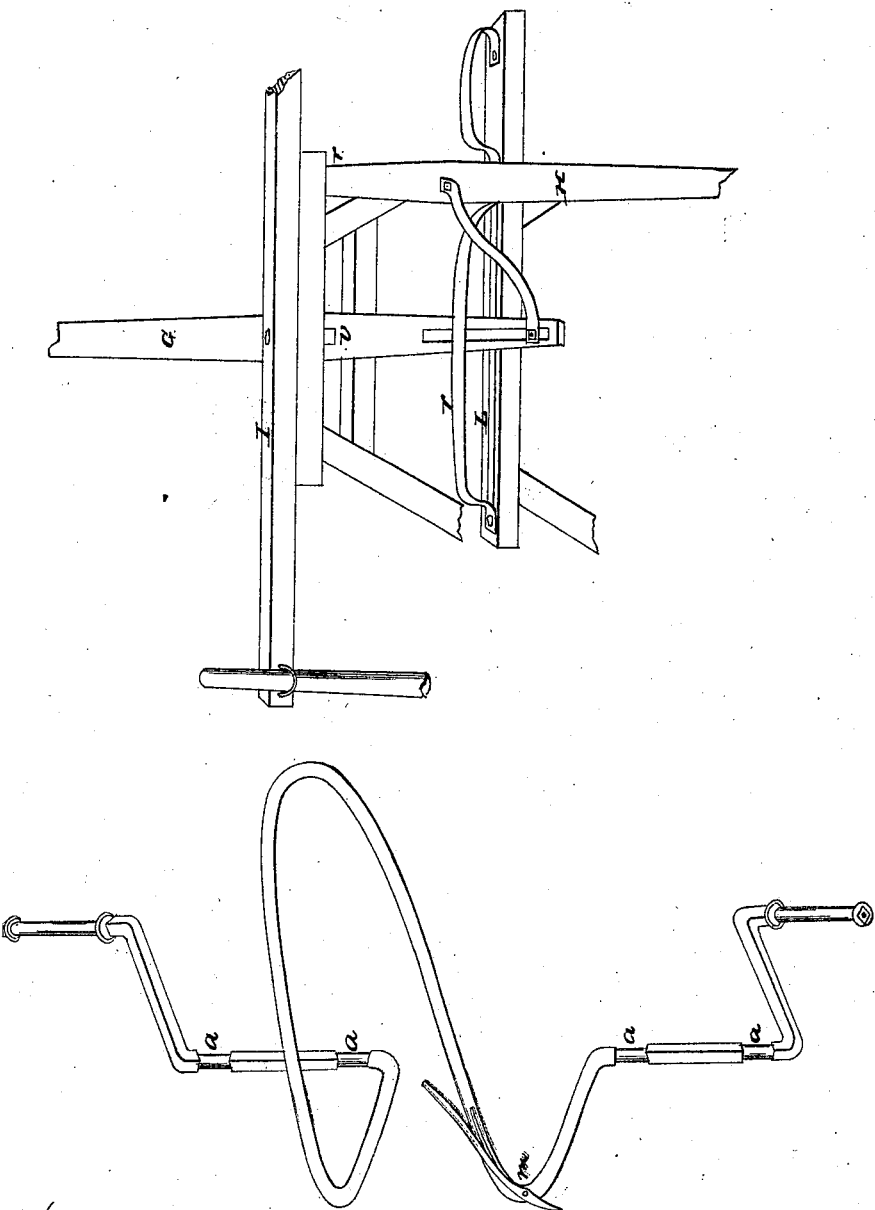
Witnesses: Inventor:

UNITED STATES PATENT OFFICE.

ISAAC A. GREEN, OF HENRY, ILLINOIS.

IMPROVEMENT IN CULTIVATORS.

Specification forming part of Letters Patent No. 34,630, dated March 11, 1862.

*To all whom it may concern:*

Be it known that I, ISAAC A. GREEN, of the city of Henry, in Marshall county, and State of Illinois, have invented a new and Improved Cultivator; and I do hereby declare the following to be a full, clear, and exact description of the same, reference being had to the annexed drawings, making part of this specification, in which—

Figure 1 is a perspective view of my said machine; and Figs. 2 and 3 are parts of the same, to be hereinafter referred to and explained.

My invention consists in a novel arrangement of mechanical devices in respect to each other, so as to combine in one cultivator several distinct and useful features, none of which are new, considered by themselves, but when taken together form a novel and useful machine.

To enable others skilled in the arts to which my invention appertains to make and use the same, I will proceed to describe its different features in their regular order.

First, as to the construction of the frame and the manner of raising and lowering the cultivators. The axle of the machine is shown in Fig. 1 by A. It is cranked and bowed, as shown by Fig. 3, and upon it at the journals $a\ a$ the main frame B of the machine rests. This frame is made in two parts, between which the bow S of the axle is arranged. On the rear end of the main frame the driver's seat J is erected. By this means the hand of the driver is brought within convenient reach of the bow of the axle, which he draws up or presses down whenever he desires to raise or lower the cultivators. The positions of the cultivators are fixed by means of a spring-catch, D, which works in notches cut in the edge of the segment C, which is bolted to the frame B and arranged at the side of the bend $m$ of the axle.

Second, as to the manner of guiding the machine laterally. The rear part of the tongue G is supported on a frame erected on the front part of the main frame for that purpose. This frame consists of the pieces E E, L L', and N, arranged in the manner shown. To the top of this frame the tongue is pivoted at $v$, so as to leave the rear end free to vibrate horizontally under the stay-bar $r$, bolted to the top of the piece L'. The rear end of the tongue is connected to a lever, H, by means of the link J, and the front end of the said lever is pivoted to the frame at H, and the rear end thereof is carried back to the driver's seat. By this means the driver is enabled to give the machine a sudden lateral movement, so that in case the rows of plants be crooked the driver can move the cultivators to one side or the other, so as not to plow out those plants that stand out of a straight line.

Third, as to the manner in which the machine is made to pass over the tops of the plants without touching them, even after they have grown to be quite large. This is done by raising the rear part of the tongue in the manner described, and by the long bow in the axle, and by raising the driver's seat, as before explained, and by making the main frame in two parts, so as to allow the plants to pass between them, under the tongue, the driver's seat, and the bow in the axle.

Fourth, as to the manner of applying the power to the machine by which it is drawn forward. O O' are the two draft-bars. They are arranged vertically one on each side of the front end of the machine. Their lower ends are pivoted at $n$ to braces fixed to the main frame for that purpose, and their upper ends pass freely through loops or bows made in or fixed to the swivel-piece I. The hooks to which the single-trees are attached are shown by P P. These hooks may be placed higher up or lower down in these bars, so as to raise the single-trees above the tops of the plants. By this means all the advantages of a double-tree are obtained, without any of its disadvantages, when applied to this kind of a machine. It is in fact a new arrangement of double-tree, which, while it equalizes the draft on the team, is out of the way of the plants.

It will be seen that in creating this machine I have combined four distinct features—viz., that of raising and lowering the machine; that of moving it laterally; that of causing it to pass over the tops of large plants without striking them, and that of applying the power so as not to interfere with the plants, and so as to equalize the draft on the team.

What I claim, therefore, as my invention, and desire to secure by Letters Patent, is—

These four features combined in one machine in the manner described, the first feature consisting of the main frame, the bowed and cranked axle, and driver's seat, arranged in respect to each other as described; the second consisting of the arrangement of the tongue G, the lever H, and the driver's seat J in relation to each other as set forth; the third consisting in making the main frame in two parts, arranging and elevating the driver's seat J and the frame E E, L L', and N thereon, and the bow of the axle therein, as set forth; the fourth feature consisting of the bars O O, the frame E E, L L', and N, the swivel I, and the main frame, arranged in relation to each other as set forth.

ISAAC A. GREEN.

Witnesses:
    PELEG L. D. WHITE,
    SAML. J. MCFADDIN.